United States Patent Office 3,068,901
Patented Dec. 18, 1962

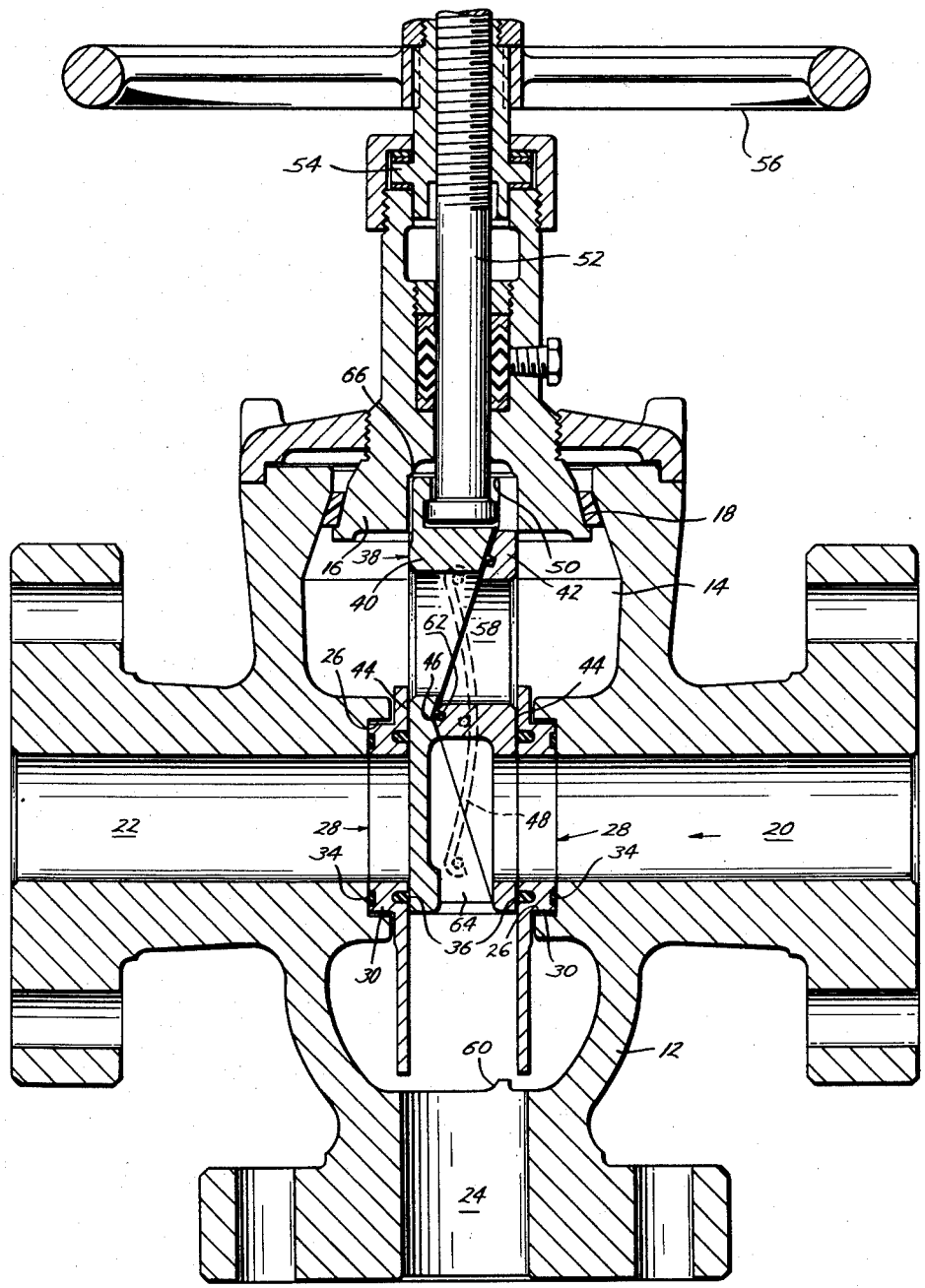

3,068,901
THREE WAY GATE VALVE
Clifford E. Anderson, Houston, Tex., assignor to ACF Industries Incorporated, New York, N.Y., a corporation of New Jersey
Filed Apr. 22, 1960, Ser. No. 23,991
4 Claims. (Cl. 137—625.48)

This invention relates to valves and more particularly a high pressure three way gate valve.

Gate valves and even more particularly "through conduit" gate valves have been extensively used by the petroleum industry to control the flow of oil and gas especially when high pressure is involved. Through conduit gate valves, those having a uniform smooth-walled, unbroken passageway therethrough for the fluid controlled by the valve in the fully open position, have been used almost universally in the run of Christmas trees when the pressure of the well being controlled is over two thousand pounds, which in today's high pressure fields is quite common. Some of the reasons for using a gate valve in high pressure service are that the operating torque is considerably less than for other types of valves, such as plug valves, and the seal obtainable is more reliable. Through conduit type gate valves offer the additional advantage of presenting a full open unobstructed passageway. Certain types of through conduit gate valves, such as those manufactured in accordance with Laurent U.S. Reissue Patent No. Re. 20,101, have a valve member which isolates the flow passageway from the body in the fully open and fully closed position, thereby the fluid flowing through the line is completely contained within the run of the valve itself and the interior of the valve is maintained free from pressure and fluid. However, gate valves, because of their particular construction, have always been limited to having a single outlet port which, especially in through conduit gate valves, is axially aligned with the inlet port.

Many state regulatory bodies require operators to make a periodic test of each producing well. Such tests provide information useful in the conservation of the underground reservoir. Operators themselves make other tests. In order to make these tests, the flow from the well is diverted from the production line to a test setup. To divert this flow, it is either necessary to provide each flow line with a three way valve or to control the flow by the use of a valve manifold. With a three way valve, the operator can be more certain that the flow is either on test or production, whereas, with the manifold system both valves have to be checked and it is possible that the two will be open when one should be closed. In an offshore drilling program where there is a central platform and several satellite platforms containing several wells each, a flow line from each well is run to the central platform where they are manifolded. If a three way valve is used, only one production line and one test line are necessary from each satellite platform. Also, if the three way valves are provided with remote control operators, the entire testing operation may be handled from the central platform. While three way plug valves and three way diaphragm valves are commercially available, the three way plug valves are not available in the higher pressure ratings and neither the diaphragm control valves nor plug valves normally provide as reliable a seal as a gate valve. However, as far as known, no three way high pressure gate valve has been available even though its sealing characteristics, low operating torque and easy adaptability to remote control operation are well accepted. The present invention is directed to a high pressure three way gate valve.

The three way gate valve of the present invention has a housing which has an inlet port and two outlet ports communicating with an internal valve chamber. Located in the valve chamber is a reciprocating valve member. The valve member has a through passage which can align with the inlet port and first outlet port and a passage which can connect the inlet passage and second outlet passage. Valve seat members are located in pockets surrounding the inlet port and first outlet port. The valve member and seat members are so designed that in either position the valve member and seats are in sealing contact; therefore, there is no leakage across the face of seats into the valve chamber. Accordingly, when the valve is positioned so that the inlet port and first outlet port are connected, there is no flow into the valve chamber and consequently into the second outlet port. The same is true when the inlet port is connected with the second outlet port. Also, the valve is so designed that there is no flow back from the disconnected outlet port. Accordingly, the flow from the inlet port is directed to the respective outlet port to which it is connected and the fluid is confined within the passage through the valve member so that it is not improperly directed.

It is an object of the present invention to provide a high pressure three way gate valve.

It is another object to provide a three way gate valve in which the valve member maintains a seal in both positions.

It is a further object to provide a three way valve which is easy to operate and which provides a positive seal in either postion.

It is a more specific object to provide a three way gate valve having an expandable gate member which will provide a mechanical seal in both positions.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purpose of illustration and description and is shown in the accompanying drawings, forming a part of the specification, wherein the FIGURE is a vertical sectional view of a three way gate valve of the present invention.

Referring now to the drawing, the three way valve has a housing 12 which is provided with an open-ended internal valve chamber 14. The open end of the chamber 14 is closed by a detachable bonnet 16. To provide a seal between the open end of the body and bonnet, a pressure sealing ring 18 such as shown in Laurent U.S. Patent No. 2,582,996 is utilized. If desired, the bonnet 16 may be bolted to the top of the body 12 and a suitable sealing ring provided between the top of the body and bonnet, as is well known in the art. The body is provided with an inlet port 20 which communicates with the valve chamber 14. Diametrically opposed to the inlet port 20, but axially aligned therewith, is a first outlet port 22 which also communicates with the valve chamber 14. A second outlet port 24 which has its axis perpendicular to the common axis of the inlet port 20 and first outlet port 22 likewise communicates with the chamber 14. The outer ends of the inlet port and two outlet ports are shown terminating in flanges for connection to the flow system. Naturally, any of the other well known means of finishing such ends so that the valve may be integrated in the flow system may be utilized.

Surrounding the inlet port 20 and first outlet port 22 are annular pockets 26—26. These pockets have one side open to their respective port and another side open to the valve chamber 14. A valve seat member 28 is located in each of the pockets 26. Each seat member 28 has a hub portion 30 which is of a slightly smaller diameter than the annular pocket 26; therefore, the hub portion 30 of the seat member 28 loosely fits within its annular pocket 26. The axially outer wall of the hub portion 30 is provided with an annular groove in which is positioned a deformable plastic ring 34. The ring 34 extends slightly beyond the surface of the back wall of the hub portion 30. The front face of the seat member 28 is likewise provided with a deformable member 36 which extends slightly above the face of the seat member 28. This seat, and its particular method of function, is more fully described in Anderson et al. co-pending application S.N. 724,638, filed March 28, 1958, now Patent Number 3,006,601.

Located in the valve chamber 14 between the seat members 28—28 and axially aligned with the outlet port 24 is a reciprocating valve member 38. While the valve member 38 is formed of two sections, a gate 40 and segment 42, it is generally rectangular and has parallel sealing faces 44—44 which are adjacent the seat members 28—28. The abutting faces of the gate 40 and segment 42 are angularly disposed with respect to the line of movement of the valve member 38 to form surfaces which provide a wedging action when the gate and segment are moved longitudinally relative to each other for the purpose of expanding the valve mechanism 38 to bring the parallel sealing faces 44—44 into sealing engagement with the seats 28—28. In order to make this wedging action positive in both directions of movement of the gate 40 relative to the segment 42, these abutting angular faces diverge in both directions from a middle point 46. This arrangement forms a double wedge which is positive acting in either direction of movement of the gate 40 relative to the segment 42. The gate 40 and segment 42 are assembled together as a unit to form valve member 38 and are movable as a unit except when they are given a relative movement to expand them against the seat members 28—28. The valve member 38 is held in this unitary relation by means of a pair of spring members 48 (one shown). One spring is disposed on each side of the valve member 38. The action of these springs 48 is to yieldingly hold the gate and segment together with their annular wedging faces in contact and to return the gate and segment into this relation when the valve member is relieved of expanding force during the travel of the valve member from one position to another. In the above respects, the valve member 38 is similar to the valve member more fully disclosed in Laurent U.S. Reissue Patent No. Re. 20,101.

In order to move the valve member 38, one end of the gate 40 is provided with a T-slot 50 into which the T-headed end of an operating stem 52 is positioned. The stem 52 extends through a passage in the bonnet 16. The necessary packing and bearings are provided in the bonnet 16. The end of the stem 52 projecting from the top of the bonnet is threadingly engaged with a stem nut 54 to which a handwheel 56 is attached. Rotation of the handwheel 56 will cause the stem 52 to reciprocate causing the valve member 38 to correspondingly move. If desired, an operator such as shown in my co-pending application S.N. 703,683 may be attached to the end of the stem 52 to provide remote control operation. Naturally, as is well known in the art, any of the many other types of remote control operators adapted for attachment to a rising stem valve may be used.

The gate mechanism 38 is provided with a through passage 58 which can be aligned with the inlet port 20 and outlet port 22. When the valve member 38 is so aligned, the segment 42 contacts a stop 60. Since further movement of the segment 42 is arrested by the stop 60, a slight continual rotation of the handwheel 54 causes the gate 40 to move relative to the segment 42 resulting in expansion of the valve mechanism 38 which forces the sealing faces 44 of the valve member into sealing engagement with the faces of the seat members 28. The deformable members 36 will aid in establishing a more positive seal between the sealing faces 44 of the valve mechanism 38 and the seats 28. This expanding action will also cause the seats 28 to move deeper into their respective pockets and the deformable sealing members 34 on the back wall of the seats 28 form a seal between the seat and its respective pocket. Therefore, there will be no flow across the face or around the back of the seat and consequently no flow into the valve chamber 14 which could flow into the outlet passage 24. While a seal can be formed between the abutting faces of the gate and segment which form part of the through passage 58 by grinding and carefully mating such surfaces, the angular face of the segment 42 is provided with an annular groove in which is placed a resilient member 62 which aids in forming such a seal between the abutting angular faces of the gate and segment. Accordingly, all fluid entering through the inlet passage 20 will pass out through the outlet passage 22 and no fluid will enter the valve chamber 14 where it could flow to the outlet passage 24. The valve member is provided with a second passage 64 which connects the inlet passage 20 and the outlet passage 24.

When the valve member 38 is so positioned that the passage 64 connects the inlet port 20 and outlet port 24, the segment 42 contacts a stop 66 in the bonnet 16 and further movement of the segment is restrained; therefore, a slight continual rotation of the handwheel 56 again causes the gate 40 to move relative to the segment 42 resulting in expansion of the valve member 38 which forces the sealing faces 44 of the valve member 38 into sealing engagement with the seats 28. As previously mentioned, the deformable members 36 aid in establishing a tight seal between the sealing faces 44 and seats 28. Also, the abutting faces of gate and segment are in intimate sealing contact. Accordingly, all fluid flowing through the inlet port 20 is now directed through the outlet port 24 and no fluid enters the outlet port 22. Since the valve member 38 in either position expands to establish a mechanical seal between the seats 28, and a seal is established between the portion of the abutting faces of the gate and segment forming the passage, any back pressure in either the outlet passages 22 or 24 can not reenter the operating passage and commingle with fluid from the inlet passage 20. When the inlet passage 20 is connected with the outlet passage 24, the sealing faces 44 of the valve member 38 are in direct sealing contact with the seats 28—28 of the inlet passage 20 and outlet passage 22, and any fluid coming from the outlet passage 22 is prevented from flowing in past the face of the seat member 28 to enter into the valve chamber 14 where it could then enter the passage 64. On the other hand, when the inlet passage 20 is connected with the outlet passage 22, a seal is again established between the seats 28—28 and the sealing faces 44 of the valve member 38. Also, the intimate sealing contact of the abutting surfaces of the gate and segment and the resilient ring 62 prohibits fluid even at a higher pressure, which may be in outlet port 24, from entering the through passage 54.

As can be seen from the above, the present invention provides an efficient high pressure three way gate valve which, because of its inherent gate valve characteristics, is easy to operate and adaptable to remote control and which, because of its mechanical wedging valve member, provides a tight seal in either position whereby flow from the inlet port is directed to the selected outlet passage and does not enter the valve chamber where it could flow to the unselected outlet port. Also, back flow from the unconnected outlet port cannot enter the operating passage.

While the above description is directed to a three way gate valve having a two piece double wedging valve member, it is possible for the valve member to be in another form. However, it is necessary that the valve member be provided with a passage which will connect the inlet port and first outlet and a second passage which will connect the inlet port and second outlet. Also, the valve member and seats must so cooperate that in either position a seal is established between the valve member and inlet or upstream passage and the valve member and an outlet or downstream passage to direct the flow from the inlet to the connected outlet and prohibit the flow from entering into the valve chamber where it could be misdirected to the unconnected outlet port. Furthermore, it is necessary to prevent back flow from the unconnected passage from entering the selected passage. To accomplish this, it is essential that a seal be established between the upstream sealing face of the valve member and the face of the inlet seat as well as a seal around the inlet seat; and a seal established between the downstream sealing face of the valve member and the face of the axially aligned outlet port as well as a seal around such outlet seat.

As various changes may be made in the form, construction and arrangements of the parts herein without departing from the spirit and scope of the invention and without sacrificing any of its advantages, it is to be understood that all matter herein is to be interpreted as illustrative and not in a limiting sense.

I claim:

1. A three way gate valve comprising a housing having an open ended internal valve chamber, a detachable bonnet closing said open ended chamber, an inlet port communicating with said chamber, a first outlet port communicating with said chamber, said first outlet port being axially aligned with but diametrically opposed to said inlet port, a second outlet port communicating with said chamber, an annular pocket surrounding said inlet port and first outlet port, one side of each pocket being open to its respective port and another side open to the chamber, a valve seat member located in each of said pockets, a reciprocating two piece parallel expanding type valve member located in said chamber, said valve member having generally parallel sealing faces opposing the seat members and abutting angular faces whereby the valve member can parallelly expand said valve member having a through passage alignable with the inlet port and first outlet port and a second passage connectable with said inlet port and said second outlet port, said valve member and seat members being so constructed that when the through passage of the valve member is aligned with the inlet port and the first outlet port that the valve member expands to establish seals with said seat members to prevent flow between valve member and seats from either side and the abutting angular faces contact each other in sealing relationship, a stem extending from the valve member through said bonnet, means to move said valve member from one position to another.

2. A three way gate valve comprised of a housing having an open ended internal valve chamber, a detachable bonnet closing said open ended chamber, an inlet port communicating with said chamber, a first outlet port communicating with said chamber, said first outlet port being axially aligned with but diametrically opposed to said inlet port, a second outlet port communicating with said chamber, an annular pocket surrounding said inlet port and first outlet port, one side of each pocket being open to its respective port and another side open to the chamber, a valve seat member located in each of said pockets, a reciprocating two piece wedging type valve member located in said chamber, said valve member having a through passage alignable with the inlet port and first outlet port and a second passage connectable with said inlet port and said second outlet port, said valve member being so constructed that when either passage is aligned with the inlet port and its respective outlet port that the valve member expands to establish a seal with said seat members and means sealing said through passage, a stem extending from the valve member through said bonnet, means to move said valve member from one position to another.

3. A three way gate valve comprised of a housing having an open ended internal valve chamber, a detachable bonnet closing said open ended chamber, an inlet port communicating with said chamber, a first outlet port communicating with said chamber, said first outlet port being axially aligned with but diametrically opposed to said inlet port, a second outlet port communicating with said chamber, an annular pocket surrounding said inlet port and first outlet port, one side of each pocket being open to its respective port and another side open to the chamber, a valve seat member located in each of said pockets, a reciprocating valve member located in said chamber, said valve member having a through passage alignable with the inlet port and first outlet port and a second passage connectable with said inlet port and said second outlet port, said valve member formed of a gate and segment having parallel sealing faces opposing said seat faces, the abutting faces of said gate and segment diverging from a midpoint to form wedging faces so that there can be relative movement causing the valve member to expand causing the sealing faces of the valve member to move into sealing engagement with said seats, a groove in the abutting surface of the segment surrounding the through passage, a resilient sealing member in said groove whereby when the through passage is aligned with the inlet port and first outlet port the through passage is sealed, a stem extending from said gate through said bonnet to impart reciprocatory movement to said valve member.

4. A three way gate valve comprised of a housing having an open ended internal valve chamber, a detachable bonnet closing said open ended chamber, an inlet port communicating with said chamber, a first outlet port communicating with said chamber, said first outlet port being axially aligned with but diametrically opposed to said inlet port, a second outlet port communicating with said chamber, an annular pocket surrounding said inlet port and first outlet port, one side of each pocket being open to its respective port and another side open to the chamber, a valve seat member located in each of said pockets, a reciprocating valve member located in said chamber, said valve member having a through passage alignable with the inlet port and first outlet port and a second passage connectable with said inlet port and said second outlet port, said valve member formed of a gate and a segment having parallel sealing faces opposing said seats, abutting faces of said gate and segment diverging from a midpoint to form wedging surfaces, an operating stem attached to said gate and extending through said bonnet, arresting means for said segment so that upon alignment of one of said passages with the inlet and one of the outlets the valve member may be expanded to cause the sealing faces to sealingly engage the seats and the abutting faces come into intimate contact.

References Cited in the file of this patent

UNITED STATES PATENTS

| | | |
|---|---|---|
| Re. 24,102 | Ohls | Dec. 13, 1955 |
| 825,064 | Levey | July 3, 1906 |
| 910,163 | Benninghoff | Jan. 19, 1909 |
| 1,910,698 | King | May 23, 1933 |
| 2,868,497 | Graham | Jan. 13, 1959 |
| 2,885,172 | Natho | May 5, 1959 |
| 2,950,897 | Bryant | Aug. 30, 1960 |